Dec. 12, 1944. A. W. MORTON 2,364,743
PISTON RING
Filed Feb. 26, 1943
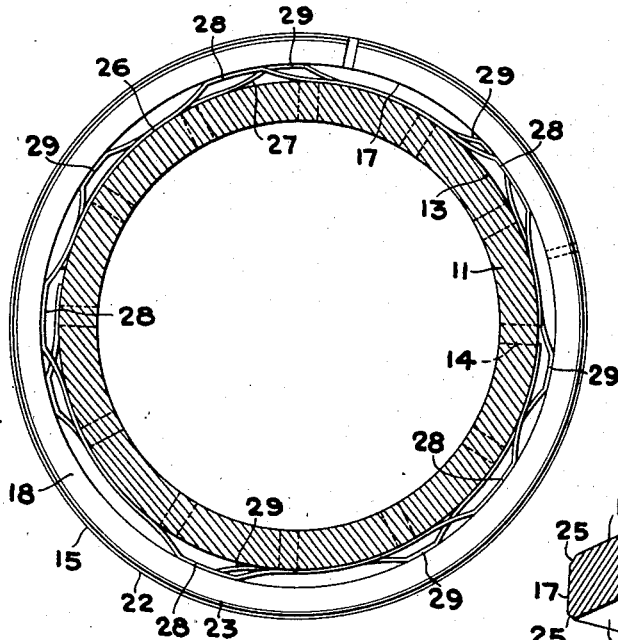
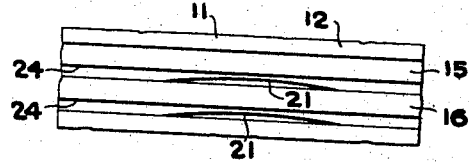
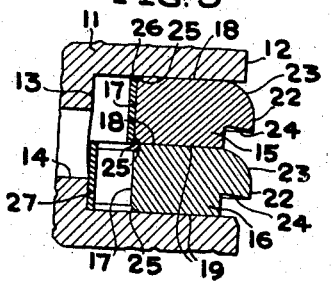
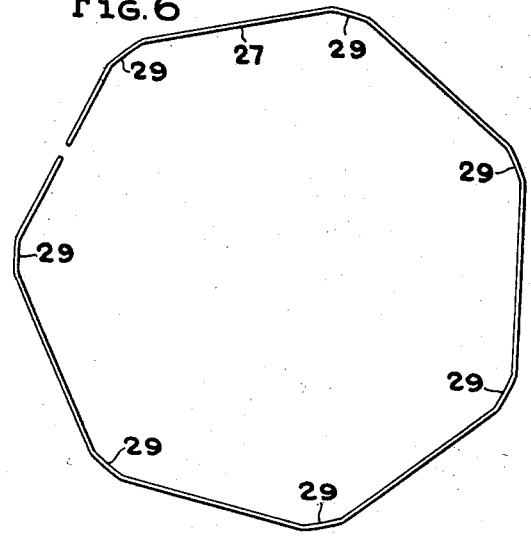
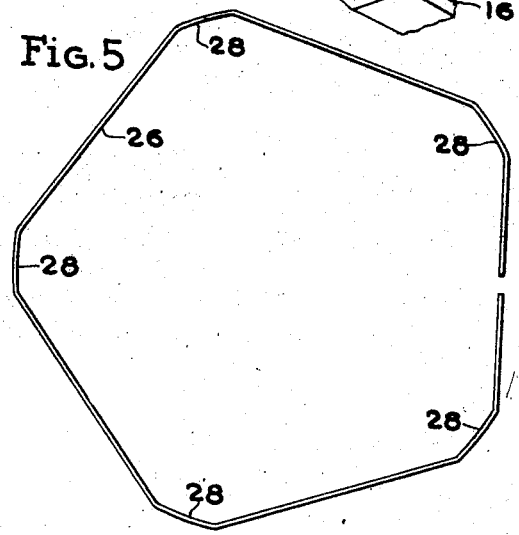
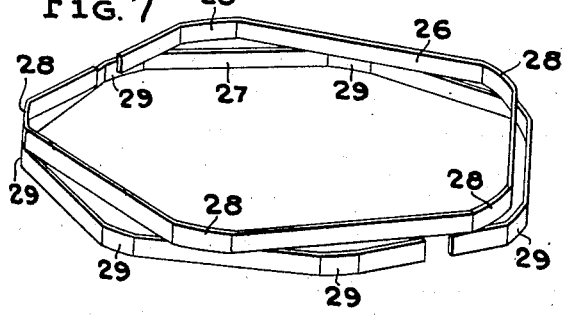
Inventor
Allen W. Morton
Attorneys Patented Dec. 12, 1944

2,364,743

UNITED STATES PATENT OFFICE 2,364,743

PISTON RING

Allen W. Morton, Baltimore, Md., assignor, by mesne assignments, to Koppers Company, Inc., a corporation of Delaware Application February 26, 1943, Serial No. 477,240

5 Claims. (Cl. 309—44)

This invention relates to piston rings and expanders therefor, and provides a novel arrangement of oil scraping rings mounted two or more in a single ring groove with individual expanders having different expansive characteristics.

Most modern aircraft engine pistons carry six rings. Near the top are three compression rings of any suitable type. A short distance below the lowermost of these, and above the piston pin, is a wide ring groove in which are mounted two oil scraping rings, the so-called dual oil rings to which the present invention particularly applies. Farther down, on the skirt, is a single oil ring of suitable type.

The dual oil rings may take different forms but a preferred form now in use will be illustrated in detail as typical. The upper one of the dual oil rings wears faster, probably because it is less copiously lubricated than the lower. Hence it is proposed, according to the invention, to subject the lower ring to a greater expanding action by differentiating the expanders. This cannot be satisfactorily accomplished by differentiating the rings.

One of the problems in using expanders one behind each of two or more rings in a single groove, arises from the tendency of the expanders to nest. To prevent this, recourse has been had to the expedient of interconnecting or interlocking the expanders with each other or with parts of the groove so that their undulation or crimps are staggered. This is objectionable, because it impairs freedom of action and in some forms requires the notching of the expanders, which is expensive and objectionable if the expanders are very narrow. Unless the notching is carefully done, strain intensifying cracks will occur.

The invention provides an arrangement in which the expanders are thin, narrow strips without notch or port; in which each expander is entirely free to shift circumferentially in the groove but cannot nest with the adjacent expander; and in which the expansive effects are readily differentiated. Adequate oil flow past the expanders is inherently provided for.

For a complete understanding of the invention, reference should be made to the accompanying drawing, in which:

Fig. 1 is a transverse section through the piston in the plane of the top of the dual ring groove.

Fig. 2 is a fragmentary elevation showing the dual oil rings in the groove.

Fig. 3 is an enlarged section, axial with respect to the piston and showing dual oil rings and expanders in one groove.

Fig. 4 is a perspective view of a fragment of one of the rings looking from beneath and indicating the form of oil seepage passage used.

Fig. 5 is a face view of the weaker expander (i. e. the upper in Figs. 1 and 3).

Fig. 6 is a face view of the stronger expander.

Fig. 7 is a perspective view of the two expanders as they appear when unstressed.

In the drawing, the piston 11 has a cylinder contacting face 12 with ring groove 13 from the rear of which the oil drainage ports 14 lead to the interior of the piston.

In the groove 13 are mounted two split expansible oil scraping rings 15 and 16, which as usual are elastic and so contoured, peened or otherwise contrived that they bear on the cylinder wall throughout their circumferences and with pressures which are uniform around their entire circumferences, so nearly as is practicable.

Each ring 15 or 16 has a cylindrical inner face 17, a plane top face 18, and a plane bottom face 19 except for the presence in the bottom face of uniformly spaced shallow radial passages 21 provided for oil seepage.

The oil scraping rim 22 of the ring, the area which contacts the cylinder wall, lies between a convex fillet 23 towards the top, and an undercut groove 24 towards the bottom of the ring.

The inner corners, at the junctions of the cylindrical face 17 with respectively the upper plane face 18 and bottom face 19 are chamfered sufficiently to prevent possible contact with adjacent expander as indicated at 25.

These two expanders 26 and 27 formed of thin, narrow strips of spring steel or other suitable material, viz. beryllium bronze are assembled edge to edge in groove 13 behind the rings. They nearly span the width of the groove 13 but have a free fit therein. The significant thing is that the expanders when unstressed are polygonal in form and are dissimilar as to the number of sides of their respective polygons. Simply as an example, the drawing illustrates one expander as approximately pentagonal and the other as approximately heptagonal.

The upper expander 26 is pentagonal, having five crimps 28 and the lower expander 27 is heptagonal, having seven crimps 29. A generally polygonal contour, such as those shown, is preferred, because expanders of such contour have demonstrated desirable spring characteristics in general use, but the invention imposes no limitation to the exact form.

The important thing is the differentiation in the number of crimps, and the consequent differentiation in the number of effective spring units per expander. This accomplishes two valuable effects. The lower expander offers a greater expanding effect, and can never nest with the upper (see Fig. 1) though each expander is free to move circumferentially in the groove 13.

The number of crimps to be used in each expander is a function of the expansive effect desired and while a differentiation by one or two crimps is commonly sufficient, any numerical differentiation will prevent nesting. Thus the selection may be based on the desired differentiation of expansive actions, and a considerable range of control may be had.

By differentiating the number of crimps and by properly selecting the form of the crimp, which also modifies the elastic action to same degree, quite precise selection of expansive action is possible so that within limits, almost any result, so far as the comparative expansive effects are concerned, is possible.

The invention imposes virtually no limitations on the form of the oil rings, uses expanders of the simplest possible form, affords good oil flow in the groove past the expanders, and permits latitude in design to secure the precise expansive effects desired. The differentiation of expansive effect can be reduced nearly to the vanishing point when desirable while retaining the antinesting characteristic. To do this the two expanders would be differentiated by only one crimp, and the stress differentiation would be minimized by the design of the crimps on the two expanders.

Thus while one embodiment has been described in detail, this merely illustrates the principles and the general applicability of the invention.

I claim:

1. The combination of a piston having a ring groove; at least two independently expansible rings mounted in said groove; and crimped expanders arranged edge to edge in the groove and contacting respective rings, said expanders being differentiated both in expansive action and in the number of crimps, whereby nesting is inhibited.

2. The combination of a piston having a ring groove; at least two independently expansible rings mounted in said groove; and expanders formed of thin resilient strips of elastic material, crimped at intervals, each expander being of axial dimension not exceeding the axial dimension of the ring which it expands, and adjacent expanders being diversified as to the numbers of crimps, whereby the expansive effects of adjacent expanders are diversified and nesting is inhibited.

3. The combination defined in claim 2 in which the expanders are each free to move circumferentially in the ring groove.

4. The combination defined in claim 2 in which the crimps are so formed that the expanders are approximately polygonal when free of stress, whereby they have long arcs of contact with the groove bottom when operatively stressed and good positioning edge-engagement between expanders is assured.

5. A multiple expander for use in a single ring-groove comprising at least two independent expanders formed each of a thin resilient strip of elastic material crimped at intervals to assume a substantially polygonal form when unstressed, the expanders being arranged edge to edge in the groove and adjacent polygonal expanders being diversified as to the number of sides whereby nesting is inhibited, the expanders being free to move independently in the direction of the circumference of the groove.

ALLEN W. MORTON.